United States Patent [19]

Bezzi et al.

[11] 4,285,645
[45] Aug. 25, 1981

[54] PRODUCING MICROSPHERES BY VIBRATIONS

[75] Inventors: Giovanni Bezzi, Bagnacavallo; Ego Pauluzzi, Bologna; Mauro Zanardi, Filattiera, all of Italy

[73] Assignee: AGIP NUCLEARE S.p.A., Rome, Italy

[21] Appl. No.: 895,365

[22] Filed: Apr. 11, 1978

[30] Foreign Application Priority Data

Apr. 15, 1977 [IT] Italy .................... 22498 A/77

[51] Int. Cl.³ .................................... B01J 2/06
[52] U.S. Cl. ................................ 425/6; 425/10; 264/13; 264/82
[58] Field of Search ........... 425/6, 10; 264/8, 9, 264/82, 13

[56] References Cited

U.S. PATENT DOCUMENTS 3,331,898  7/1967  Haas et al. ..................... 425/10
3,617,587  11/1971 Nayar ............................ 264/82
3,699,196  10/1972 Joyce et al. ..................... 264/8
3,729,278  4/1973  Lysher ........................... 264/9

Primary Examiner—Donald J. Arnold
Assistant Examiner—James R. Hall
Attorney, Agent, or Firm—Morgan, Finnegan, Pine, Foley & Lee

[57] ABSTRACT

An apparatus is disclosed for producing solid materials in form of microspheres or spherules for a number of applications, such as nuclear fuel, catalyst, fluid beds for fluidization and other like applications. An inert gas shield is provided to surround the droplets of liquid from which the microspheres shall be originated so as to prevent a premature reaction of such droplets with the reaction gas. Provision is made for renewing the braking foam placed over the liquid reactive bath and the reactive gas is supplied in the form of a blade-like stream so as to improve the contact time and intensity between the droplets and the reactive gas.

4 Claims, 1 Drawing Figure

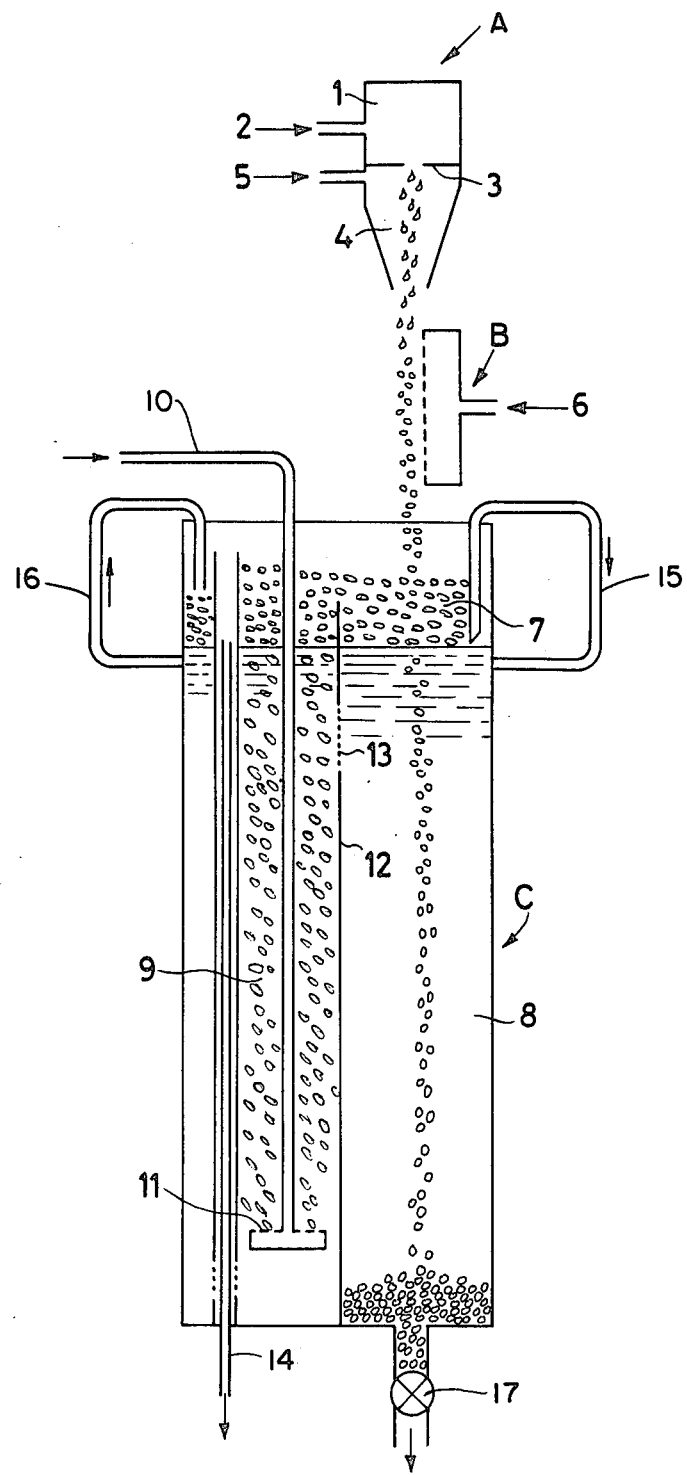

PRODUCING MICROSPHERES BY VIBRATIONS

This invention relates to an apparatus for obtaining, by vibrations, spheroidal particles which can be used in the nuclear field as fuels, and in other fields, such as for catalysts.

Method and apparatus are known for producing spheroidal particles by vibratory droplet-producing machines which employ droplet gelification methods. There are known, for example, methods by which a solution is caused to flow through one or more nozzles so as to produce a liquid stream which is fractioned into a multitude of droplets by vibrations. The droplets which are thus formed are caused to pass through a reactive gaseous environment in which their solidification is started, to be subsequently completed within a reactive liquid environment distinct from the gaseous environment by a layer of foam: the foam layer is intended to reduce the deformation of the droplets, which are only partially hardened, as they impinge on the liquid surface. In order to reduce the possibility of nozzle clogging and of premature gelling of the liquid stream, systems are known which use vacuum to isolate the gaseous reactive environment from the space in which the droplets have not yet been well grown.

The methods outlined above are affected by difficulties when applied to the process of precipitation supported on gel which is best known as the SNAM method, as disclosed in the Italian Patent Specification Nos. 727,301 and 778,786.

These difficulties are, for example, the inadequate pre-gelling of the droplets and the characteristics of the foam which dampens the falling of the partially solidified droplets in the reactive liquor.

The present invention has as its subject-matter the apparatus for obtaining spheroidal particles with the precipitation method supported on gel and is an improvement over that which is known heretofore, especially as regards the protection of the header from which the liquid stream emerges to be fractioned into droplets by vibrations, the pre-gelling of the droplets and the characteristics of the foam which dampens the falling of the spheroidal partially solidified particles in the liquid reactive environment.

It is obvious that all that which is the subject-matter of the present invention, even if it has been specially envisaged in connection with the SNAM method aforementioned, is not only applicable to that method but can be used for other processes in the nuclear field and also in the non-nuclear field and, in addition, it can be applied to other types of droplet-forming apparatus, which are not necessarily of the vibratory type, when the droplets acquire so high a dropping speed as to require dampening in order that deformation may be prevented.

An aspect of the present invention is to protect the vibratory header against the hazard of clogging of the dropping nozzle as a result of the reaction of the feed solution with the gaseous reactant, and also to prevent a premature gelling of the droplets before that they have taken up a satisfactory shape.

This result is achieved by means of a non-reactive gas such as air, nitrogen and others, which provides an inert conical hood under the header and prevents that the gaseous pre-gelling reactant may flow towards the droplet-formation area and towards the dropping nozzle as well.

It is recommended that the conical hood be so sized as to prevent a tearing action which could be conductive to a splitting of the liquid stream which would be not due to the effect of the vibrations only.

Another aspect of the present invention is connected with the pre-gelling of the droplets by reaction thereof with the reactive gas. The pre-gelling is improved by increasing the concentration of the reactive gas, which should preferably be anhydrous, and by increasing also the time of contact between the droplets and the gas. These conditions can efficiently be obtained by using for the pre-gelling stage, as a distributor for the reactive gas, a vertical tube having slots along its length wherein the vertical tube is positioned parallel to the path of the droplets with the slots at a small distance therefrom.

There is obtained, therefore, a blade-like stream of reactive concentrated gas which reacts with the droplets during the entire time they take for travelling over a path equal to the length of the tube.

Still another aspect of the present invention is concerned with the dampening foam which preferably is of the dynamic type, that is, it must continuously be renewed and should not exhibit excessive thickenings which could cause the spherules falling through the foam to become clustered together. In addition, the foam must allow an easy perforation of the interface between the foam and the reactive liquid, in which the spherules complete their solidification. These results are obtained by bubbling a reactive gas in the liquid reactant. In the latter, a mixture of a foaming agent and a surfactant is dissolved so as to facilitate the penetration of the foam-liquid interface by the spherules. It is preferred that both the foaming agent and the surfactant be exempt from metal ions in such an amount as to pollute the product.

A partition wall separates, in the vessel which contains the reactive liquid, the bubbling area from the stagnating area in which the microspheres are collected. The thick foam which tends to be formed in the stagnating area on the surface of the reactive liquid and which could lead to the formation of sphere clusters is continuously removed by a pump and recycled to the bubbling area.

By way of example and without limitation and in order that the present invention may better be understood, there will now be described with the aid of the accompanying diagrammatical drawing, the layout of the apparatus, one of the uses of which is the preparation of nuclear reactor fuel.

The apparatus comprises a header A, in which the droplets are formed by vibration: they begin to be solidified by reacting with a reactive gas emerging from a distributor B. After having been passed through a dampening foam, the droplets complete their solidifications in the vessel C which contains a reactive liquid.

The header A, capable of being, comprises a chamber 1, in which the feed solution 2 is sent: the solution, flowing through a perforated disc 3, forms a liquid stream, which, by vibration of said header, is formed into droplets which pass through conical chamber 4 where they take on a spherical shape.

A stream of nonreactive gas coming from tube 5 prevents the entrance of the reactive gas into the chamber 4 and thus prevents the reactive gas from reacting with the still unshaped droplets and with the liquid stream exiting the disc, 3 which could clog the disc hole (in the drawing a single hole has been shown, but the disc could equally well be a complete spinneret).

At the exit of the chamber 4 the droplets fall in front of the distributor B so that a stream of reactive gas 6, strikes them to start their solidification.

As shown the distributor B for slots designed to deliver, throughout the entire length of the distributor B, a stream of reactive gas onto the droplets so as to extend to a maximum the time of contact of the droplets with the gas. The spherules which, by virtue of the action of the reactive gas, have attained a certain consistency fall, after having been passed through the dampening foam 7, in the stagnation area 8 of the vessel C where their solidification is completed by the reaction with the reactive liquid.

The vessel C contains a reactive liquid in which there is dissolved a mixture of a foaming agent and a surfactant in the appropriate proportions. It is recommended that these compounds be free of metallic ions in order that the microspheres are not polluted.

Foaming is obtained by bubbling through the bubbling area 9 of the vessel C a reactive gas 10 through the foraminous diaphragm 11. A partition wall 12, having a wire gauze 13 for equalizing the liquid levels of 8 and 9, separate the bubbling region from the quiet region and allows the foam to straddle into the spot in which the spherules are caused to drop.

The thickness of the foam layer is adjusted by the flow of the bubbling gas in tube 10 and the level of the reactive liquid which is controlled by an overflow pipe 14.

The foam is continuously renewed in the area where the spherules are dropped and, to prevent a thickening of the foam which may cause the spherules to coalesce into clusters, foam is continuously removed at the interface between the surface of the foam and the reactive liquid, by the tube 15 which recycles the foam towards the bubbling area through the tube 16.

The finished spherules are discharged from the vessel C by manipulating a bottom cock 17.

The invention is further illustrated by the following example:

EXAMPLE

Exemplary of the nuclear fuel which can be prepared using the apparatus of this invention is the solidification into spherules of a solution which contains uranium.

A solution which contains uranyl nitrate and which has a viscosity of 30 centistokes is caused to drop, through a hole having a diameter of 100 microns by applying to the header Aa lateral vibration at a frequency of 600 Hz. The reactive gas is, in the present case, anhydrous ammonia and the reactive liquid is ammonium hydroxide. The spherules are formed of uranium oxide having a diameter of approximately 80 microns. The diameter of the spherules, however, can be modified, for example, by varying the composition of the solution, the diameter of the dropping hole, the amplitude and the frequency of the vibrations, and other factors.

While the invention has been described with reference to a preferred embodiment thereof, the basic idea of the invention is susceptible of a number of different applications.

In addition, without departing from the scope of the invention, many modifications can be introduced therein in the reduction to practice, all these modifications being within the purview of anyone skilled in the art.

We claim:

1. In an apparatus for producing spheres from a solidifiable solution, comprising: a dropping header for receiving the solution, a disc having at least one dropping hole for forming droplets from the solution, and a collection vessel spaced from and below the dropping header having a reactive liquid therein through which the droplets from the header fall and become solid spheres, the improvement comprising:

means between the header and vessel connected to the header and having a chamber below each dropping hole through which the droplets fall, means connected to said chamber means for supplying inert gas which contacts the droplets falling through said chamber to prevent pre-hardening thereof, a reactive gas distributor between the header and vessel and below and parallel to the path of the droplets which fall from said chamber means for sending a stream of reactive gas onto the falling droplets for partially hardening such droplets before they fall into the collection vessel; and means connected to the vessel for providing and continuously renewing a dampening layer of foam on the reactive liquid in the vessel adapted to be penetrated by the partially hardened droplets while preventing deformation thereof as they fall and impinge upon the reactive liquid, including tube means in the vessel for removing foam at the foam/reactive liquid interface in the region where the partially hardened droplets first impinge upon the reactive liquid.

2. The apparatus of claim 1, wherein said chamber means is a conically shaped hood.

3. The apparatus of claim 1, wherein said reactive gas distributor includes a vertical tube with slots therein which provide a blade-like stream of reactive gas that reacts with the falling droplets the entire time they take to travel along the length of said vertical tube.

4. The apparatus of claim 1, wherein said vessel includes a partition therein which divides said vessel into a bubbling region and a quiet region;

wherein said means for producing and continuously renewing the dampening layer of foam includes a foaming agent and a surfactant in the reactive liquid, means in said bubbling region of said vessel for bubbling a reactive gas up through the reactive liquid to form a layer of foam from said foaming agent on the surface of the reactive liquid; and wherein said header, chamber means, and distributor are positioned relative to said vessel so as to cause the droplets to fall thrugh the dampening layer of foam into the reactive liquid in said quiet region.

* * * * *